United States Patent [19]

Masuda

[11] Patent Number: 5,573,299
[45] Date of Patent: Nov. 12, 1996

[54] MODULE CARRIER STRUCTURE FOR VEHICLE FRONT END HAVING A GROOVE FOR A WIRE HARNESS

[75] Inventor: Toshio Masuda, Ashikaga, Japan

[73] Assignee: Fuji Jukogyo Kabushiki Kaisha, Tokyo, Japan

[21] Appl. No.: 327,473

[22] Filed: Oct. 21, 1994

[30] Foreign Application Priority Data

Oct. 25, 1993 [JP] Japan ................................ 5-062067 U
Aug. 24, 1994 [JP] Japan .................................... 6-199358

[51] Int. Cl.$^6$ ................................................ B62D 25/08
[52] U.S. Cl. .......................................... 296/194; 180/68.4
[58] Field of Search ...................................... 296/187, 189, 296/193, 194, 197, 203; 180/68.4, 68.6

[56] References Cited

U.S. PATENT DOCUMENTS 5,123,695  6/1992  Kanemitsu et al. ........................ 296/194

FOREIGN PATENT DOCUMENTS 4-63774  2/1992  Japan ...................................... 296/194

Primary Examiner—Andrew C. Pike
Attorney, Agent, or Firm—Beveridge, DeGrandi, Weilacher & Young, L.L.P.

[57] ABSTRACT

A module carrier structure for the vehicle front end includes a horizontal upper frame portion and a horizontal middle frame portion that constitute a radiator assembly frame. The middle frame portion simply rests on a rear bumper beam of a front bumper when the carrier structure is fastened to the front of the vehicle body. The middle frame portion has in its forward surface a groove for accommodating a wire harness whereby the wire harness is protected from heat damage by the radiator and condenser in the engine compartment. The wire harness is free from damage due to a light collision of the vehicle because the bumper beam can slide relative to the middle frame portion. The harness groove may be provided in an attachment below the middle frame portion.

10 Claims, 6 Drawing Sheets

_(1)_

MODULE CARRIER STRUCTURE FOR VEHICLE FRONT END HAVING A GROOVE FOR A WIRE HARNESS

BACKGROUND OF THE INVENTION

The present invention relates to a module carrier structure for the front end of a vehicle.

An example of a prior art module carrier is disclosed in Japanese Patent Laid Open Publication (Kokai) No. 63-312279. Components such as a radiator, a fan, and the condenser of an air conditioner are mounted in a front end panel of the vehicle. The front end panel (module carrier) is removably fixed by bolts or the like to the front portion of the main body of the vehicle during the assembly process.

Various electrical devices are usually incorporated in a front portion of the engine compartment and thus a wire harness for these various electrical devices must be arranged within the engine compartment. However, these devices are positioned where they are exposed to heat radiation from surrounding components such as the radiator for cooling the engine, the condenser of an air conditioner, an oil cooler, and a catalytic converter for the exhaust system. Further, a front end portion of the engine compartment is likely to deform when subjected to light or medium collisions. This raises the problem that it is extremely difficult to arrange the wire harness in such a manner that it is not damaged by the heat radiating from these hot components and the wiring thereof is not broken by such light or medium collisions.

During the construction of a conventional automobile body, the fitter who installs the piping, wire harness, and brake-force multiplying devices in the engine compartment has to bend over from the front-fender side of the vehicle, because the engine compartment has a box-like structure, and adopt a forced posture with arms extended from the top of the engine compartment. This makes the work of the fitter more laborious and, since the engine unit is conveyed into the engine compartment having an extremely limited working area, the assembly work thereof becomes difficult.

SUMMARY OF THE INVENTION

The present invention has as its objective to solve the above problems.

In order to solve the abovementioned first problem, the present invention provides a module carrier structure for a front end of a vehicle having a front bumper with a rear bumper beam connected to the vehicle front end, a radiator in an engine compartment behind the front bumper, a condenser of an air conditioner, and a wire harness for providing electric current to various electrical equipments, comprising: a radiator assembly frame for mounting the radiator and the condenser therein; a horizontal upper frame portion provided on the assembly frame; a hormonal middle frame portion provided on the assembly frame and disposed below the upper frame portion; and harness fitting groove means provided in the middle frame portion and extending horizontally for receiving and securing the wire harness.

Fitting and mounting the wire harness into the harness fitting groove means ensures that the wire harness is completely unaffected by heat from components such as the radiator that cools the engine and the compressor of the air conditioner, which are mounted on the radiator assembly frame. Since it is also separated from other sources of heat radiation in the engine compartment such as the catalytic converter of the exhaust system and the oil cooler, there is no danger of the wire harness being damaged by heat radiating therefrom, and it is also possible to simplify the work of removing the wire harness. By configuring the assembly in such a manner that the middle frame portion is superimposed on the rear beam of the front bumper, with the module carrier mounted in the vehicle body, the rear beam simply deforms by sliding backwards from the lower side of the middle frame when the front bumper is deformed backwards by a light or medium collision. This ensures that the module carrier including the middle frame portion is virtually unaffected and thus there is no danger of the wire harness assembled into the front side of the middle frame portion being damaged.

In order to solve the second mentioned problem, the present invention provides a module carrier structure of the above stated configuration, further comprising fastening attachments removably mounted on the vehicle front end, the attachments having means for fixedly attaching thereon the rear bumper beam of the front bumper; and mounting brackets provided on the fastening attachments, respectively, and each having a horizontally extending portion with a forward-facing groove constituting the groove means, the horizontally extending portion being in supporting contact with a lower surface of the middle frame portion.

Preferred embodiments of the present invention will be understood from the following detailed description by referring to the accompanying drawings.

DESCRIPTION OF THE PREFERRED EMBODIMENTS

Figure 1:
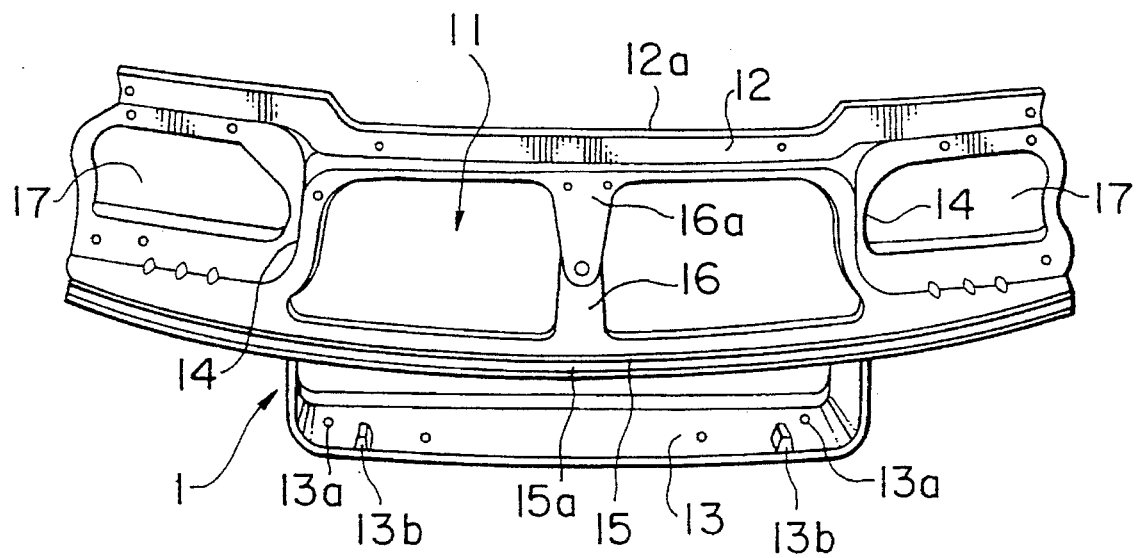
FIG. 1 is a perspective view, as seen from the front and above, of an embodiment of a module carrier structure according to the present invention.
Figure 2:
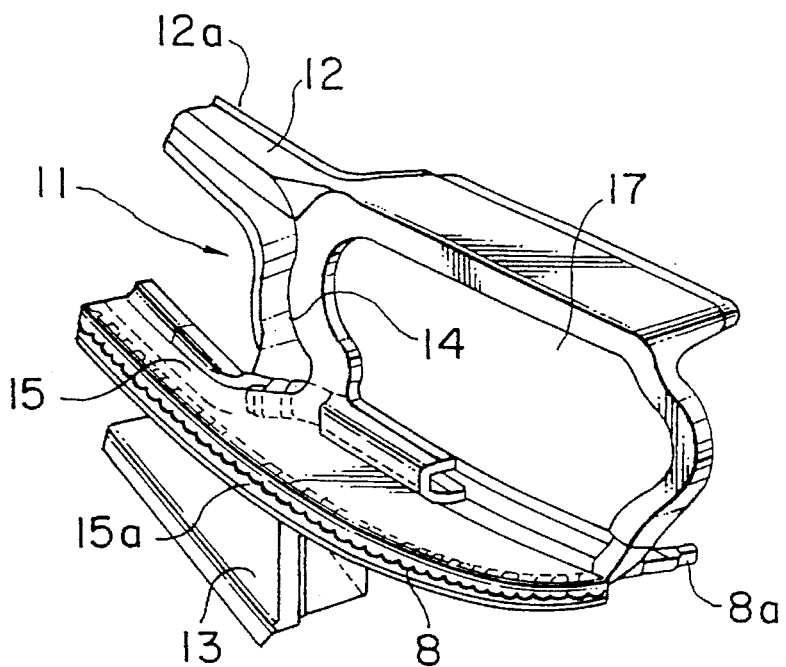
FIG. 2 is a perspective view, as seen from the left, of the module carrier structure of FIG. 1.

In FIG. 1, reference numeral 1 denotes a module carrier structure for the front end portion of a vehicle. The module carrier 1 comprises a radiator assembly frame 11 formed integrally of an upper frame portion 12, a lower support frame portion 13, and left and right vertical frame portions 14. As also shown in FIG. 2, headlight mounting portions 17 are formed integrally at either side of the module carrier 1. A middle frame portion 15 passes from left to right of the vehicle. The middle frame portion 15 is provided in a central portion between the upper frame portion 12 and support frame portion 13 of the radiator assembly frame 11, and is offset forward therefrom. Central parts of the upper frame portion 12 and the middle frame portion 15 are coupled to each other by a stay portion 16.

The upper frame portion 12 is formed to have a cutout 12a extending along a prescribed length of the rear thereof in such a manner that an upper portion of the radiator 2 is adapted to fit into the cutout 12a of the upper frame portion 12 when a radiator 2 is mounted on radiator mounts 13a of the support frame portion 13.

Condenser mounts 13b for mounting a condenser 3 of an air conditioner are provided on left and right portions of the frontmost edge of the lower support frame portion 13, with the radiator mounts 13a being located behind the condenser mounts 13b.

Figure 3:
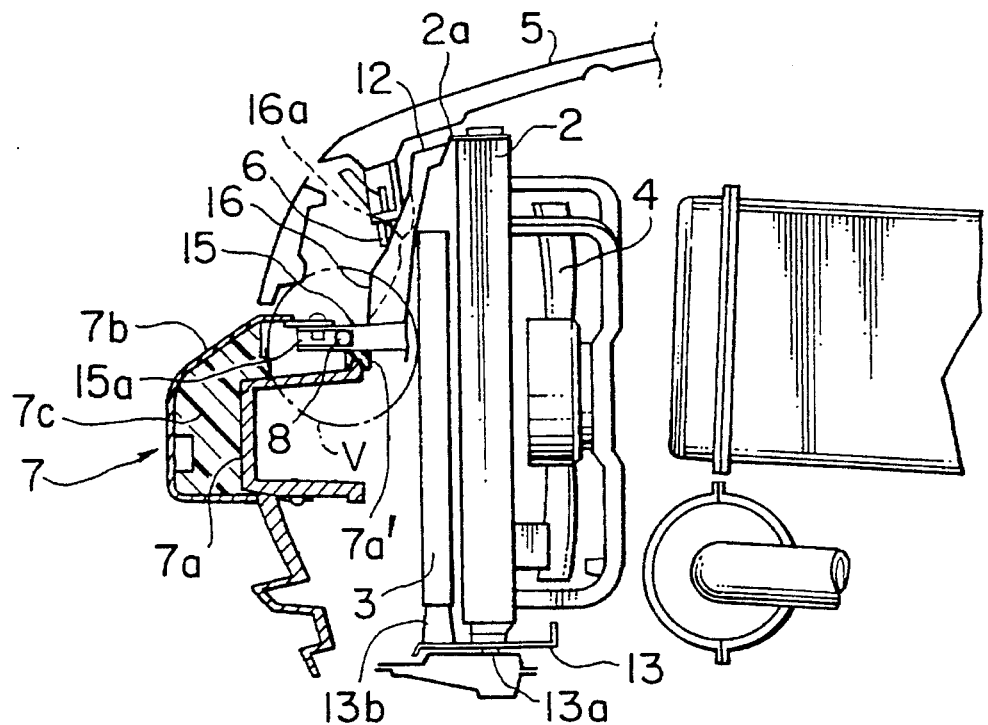
FIG. 3 is a partially cross-sectional side view of the module carrier structure mounted on the vehicle.

As shown in FIG. 3, the radiator 2 and the condenser 3 of the air conditioner are inserted into the radiator assembly frame 11 from behind the module carrier 1, and the condenser 3 is mounted onto the condenser mounts 13b of the support frame 13. Further, the radiator 2 is mounted onto the radiator mounts 13a, and a cooling fan 4 is mounted in such a manner that it is positioned in a rear portion of the radiator 2, thus forming a suction fan type of layout.

The upper portion of the radiator 2 is fitted into the cutout 12a of the upper frame 12 and is fastened to fastening members 2a. Frame portions around the periphery of the cooling fan 4 are fastened as appropriate by tightening bolts or the like coupled to the principal structural framework of the radiator assembly frame 11.

Figure 5:
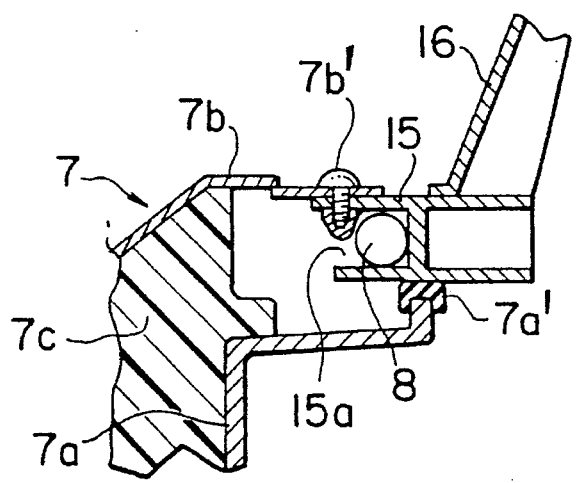
FIG. 5 is an enlarged view of part of FIG. 3 within circle V.

As can best be seen from FIG. 2, a harness fitting groove 15a is provided in a front edge portion of the middle frame 15 running from the left end thereof to the right end, and a wire harness 8 is fitted and assembled into the harness fitting groove 15a, as shown in FIG. 5. The wire harness 8 fitted and assembled into the harness fitting groove 15a is held therein in such a manner that it can not slip out of the harness fitting groove 15a by clips 7b' at a plurality of locations fastened to the top of the middle frame 15. The clips 7b' also fasten an uppermost edge of a bumper surface member 7b when a front bumper 7 is mounted, as shown in FIG. 5. Connectors 8a (see FIG. 2) provided at either end of the wire harness 8 protrude from the two ends of the harness fitting groove 15a, with the configuration such that the various wires of the wire harness are connected by these connectors 8a.

A hood lock mounting portion 16a is provided in an upper part of the stay portion 16 with a hood lock device 6 (FIG. 3) for a front hood 5 being mounted on the hood lock mounting portion 16a.

After the radiator 2, condenser 3, and cooling fan 4 are mounted as described above and headlights (not shown in the figures) are attached to the headlight mounting portions 17, the module carrier 1 is completed by fitting and assembling the wire harness 8 (main wiring) in the harness fitting groove 15a at the frontmost edge of the middle frame 15. This module carrier 1 is attached to the front portion of the vehicle body with bolts or the like, and the connectors 8a at the left and right ends of the wire harness 8 are connected to predetermined wire harness wiring. In this assembled state, a lower surface of the middle frame portion 15 is coupled to the top of a rear beam 7a of the front bumper 7 with a buffer strip 7a' (FIG. 5) therebetween, and an upper edge of the bumper surface member 7b is fastened to the upper surface of the middle frame 15 by the clips 7b'. Attaching the hood lock device 6 to the hood lock mounting portion 16a of the stay portion 16 ensures that loads inputted to the hood lock (downward loads) are distributed from the stay portion 16 to the middle frame portion 15 when the front hood 5 is closed, in such a manner that these hood lock loads are carried by the rear beam 7a of the front bumper 7 via the buffer strip 7a'.

Figure 4:
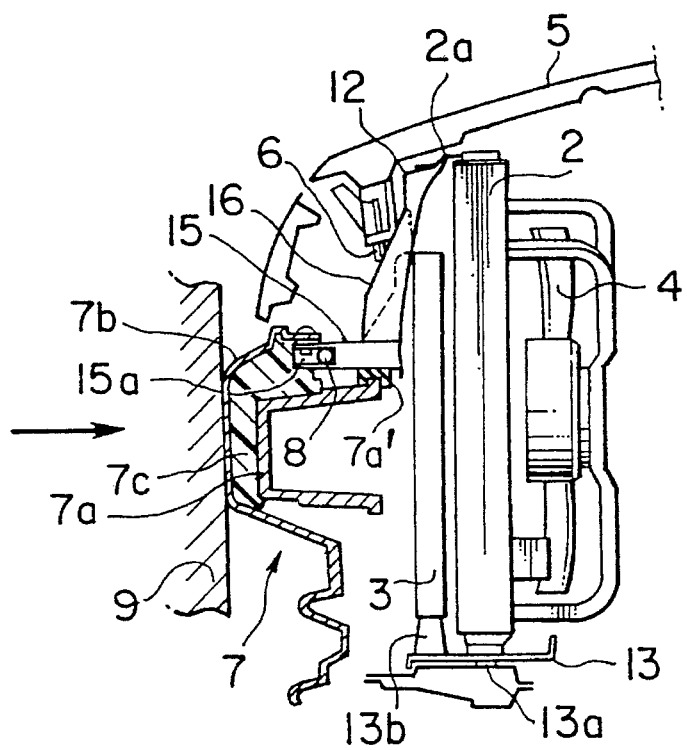
FIG. 4 is a view similar to FIG. 3, showing the module carrier structure after a light collision.

Since the middle frame portion 15 simply rests on the rear beam 7a of the front bumper 7 as described above, the module carrier 1 including the middle frame portion 15 will be virtually unaffected if the front bumper 7 should be deformed by a light or medium collision. In other words, if the front bumper 7 should strike a barrier 9 in a light or medium collision, as shown in FIG. 4, a shock absorber the rear beam 7a will be compressively deformed and the rear beam 7a will also be deformed backward. However, since the middle frame portion 15 is simply placed on the rear beam 7a with the buffer strip 7a' therebetween, the rear beam 7a simply slides backwards under the middle frame portion 15, and thus the entire module carrier 1 including the middle frame portion 15 is virtually unaffected by a light collision. Since the bumper surface member 7b is made of a thin sheet of a synthetic resin and is thus not a rigid body, the bumper surface member 7b deforms elastically during a collision and does not affect the middle frame portion 15, even though the upper edge portion thereof is coupled with the top surface of the middle frame portion 15.

Since the front edge of the middle frame portion 15 in which the wire harness 8 (main wiring) is fitted and assembled across the width of the vehicle is in front of the radiator 2 and condenser 3, it is virtually unaffected by heat radiation therefrom. Similarly, it is separated from other sources of heat radiation in the engine compartment such as the catalytic converter for the exhaust system and the oil cooler, and it is also positioned in such a manner that it is virtually unaffected by light and medium collisions as described above, so that there is virtually no danger of the wire harness 8 being subjected to heat damage or being broken in a collision. In addition, the work of removing the wire harness is extremely simple and, since the wire harness 8 is covered by the front bumper 7, it is not exposed to dust and rainwater, and also installation and maintenance are simple.

During the construction of a conventional automobile body, the fitter who installs the piping, wire harness, and brake-force multiplying devices in the engine compartment has to bend over from the front-fender side of the vehicle, because the engine compartment has a box-like structure, and adopt a forced posture with arms extended from the top of the engine compartment. This makes the work of the fitter more laborious and, since the engine unit is conveyed into the engine compartment having an extremely limited working area, the assembly work thereof becomes difficult.

Figure 10:
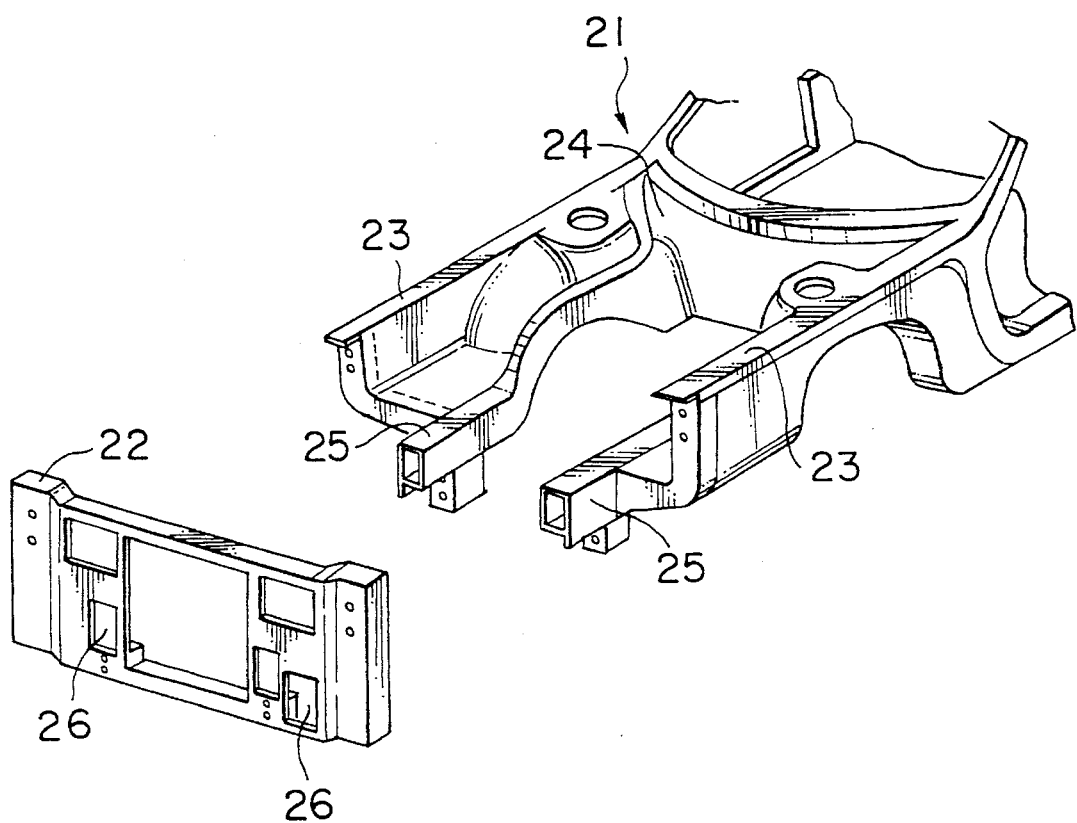
FIG. 10 is a view illustrative of a fastening mechanism of a prior art module carrier structure.

To solve this problem, the above mentioned Japanese Patent Laid Open Publication (Kokai) No. 63-312279 discloses an assembly method that is illustrated in FIG. 10. In this assembly method, a module carrier 22 that can be attached to the front portion of a vehicle body 21 is removed therefrom, and components such as a radiator, headlights, and an oil cooler are separately mounted thereon. The worker can now enter the engine compartment through a front opening thereof between front upper frames 23, to attach components such as the brake-force multiplying devices, the clutch cylinder, piping, and the wire harness to a toe board 24 and the rear surface of the engine compartment. The engine unit comprising drive-system components such as the engine itself, the transmission, and the suspension is conveyed to the lower surface of the vehicle body 21 and attached thereto, then the module carrier 22, which has openings 26 engaging with the front side members 25 at the front portion of the vehicle body 21, is attached by bolts (not shown in the figure).

In accordance with the above vehicle front structure of the prior art, removing the module carrier from the front portion of the front vehicle body makes it easier to install components and the engine unit during the process of fitting-out the vehicle, and also improves the work efficiency. However, when the module carrier is to be mounted on the front vehicle body, a troublesome operation is required. That is, in order to align the openings provided in the module carrier with the front side members of the front portion vehicle body and fix them together with bolts, a heavy module carrier to which the radiator, headlights, oil cooler and other components have previously been attached must be moved toward the front of the vehicle body in a state in which the openings and the front side members have been mutually positioned as to correspond to each other, before the openings in the module carrier are aligned with and attached to the front side members. Since this assembly work requires skill and it places a heavy workload on the worker, improvements in the workability and work efficiency are impeded.

Another embodiment of the invention that can solve the above problem will be described below.

Figure 6:
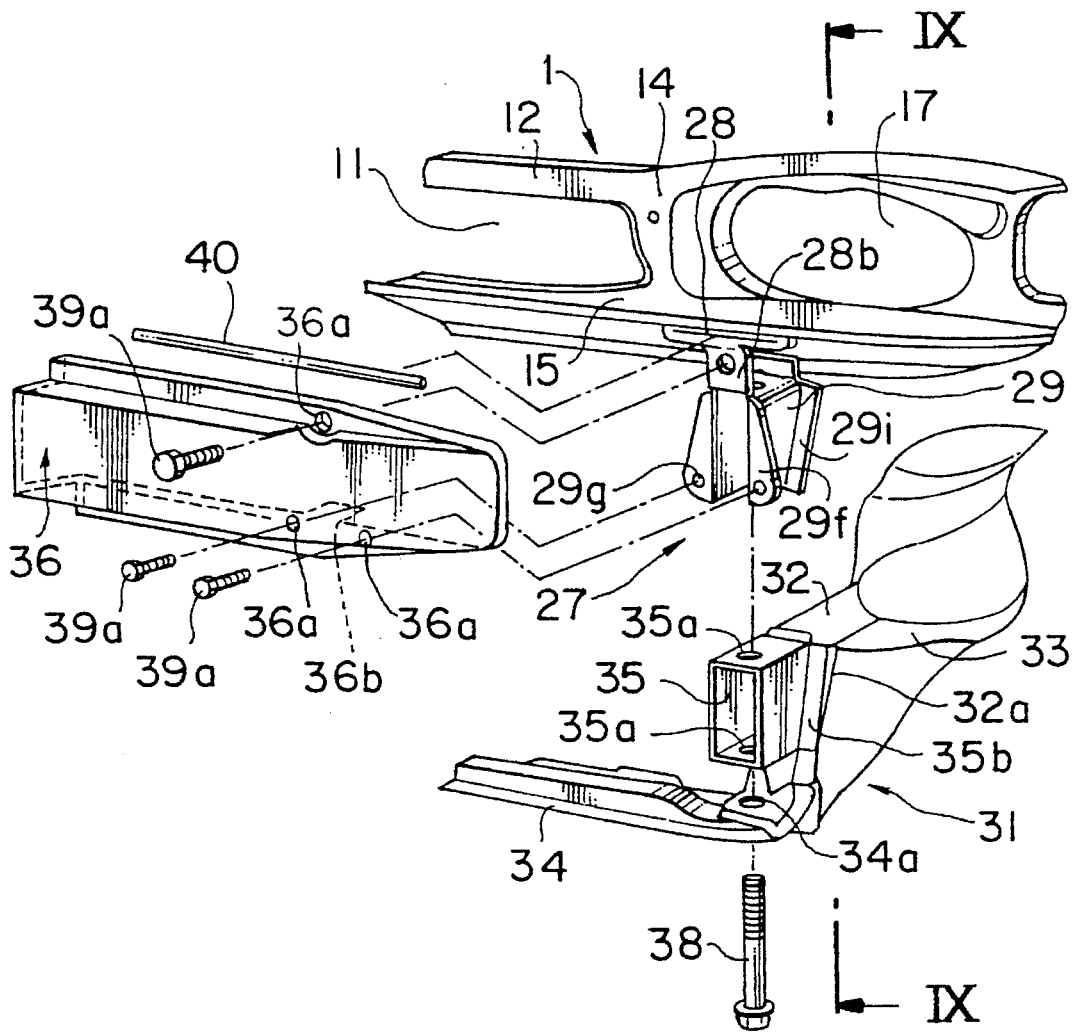
FIG. 6 is an exploded perspective view of another embodiment of the module carrier structure.

As shown in FIG. 6, a module carrier 1 has an integral structure of a radiator assembly frame 11 provided in a center portion thereof and formed of an upper frame portion 12, a middle frame portion 15, and a pair of left and right vertical frame portions 14, with a headlight mounting portion 17 formed on either side.

Figure 7:
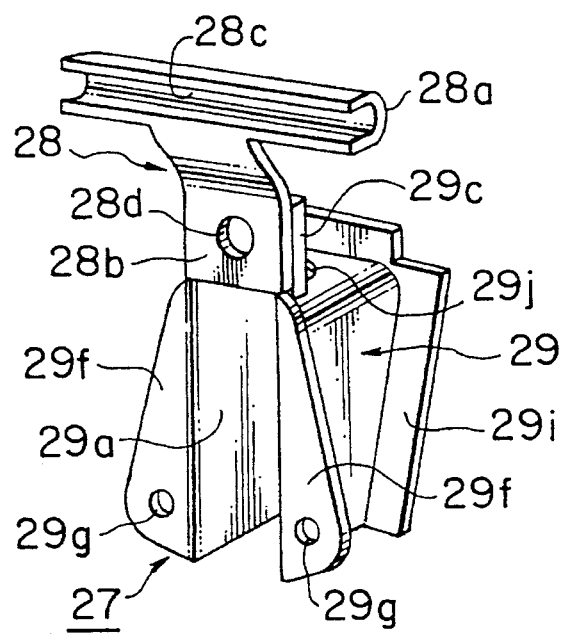
FIG. 7 is an enlarged perspective view of a fastening attachment shown in FIG. 6.

A plurality of attachments 27 for fastening are fixed at predetermined positions on a lower portion of the module carrier 1. Each of the attachments 27 comprises a mounting bracket 28 and an attachment body 29, as shown in FIG. 7.

Figure 9:
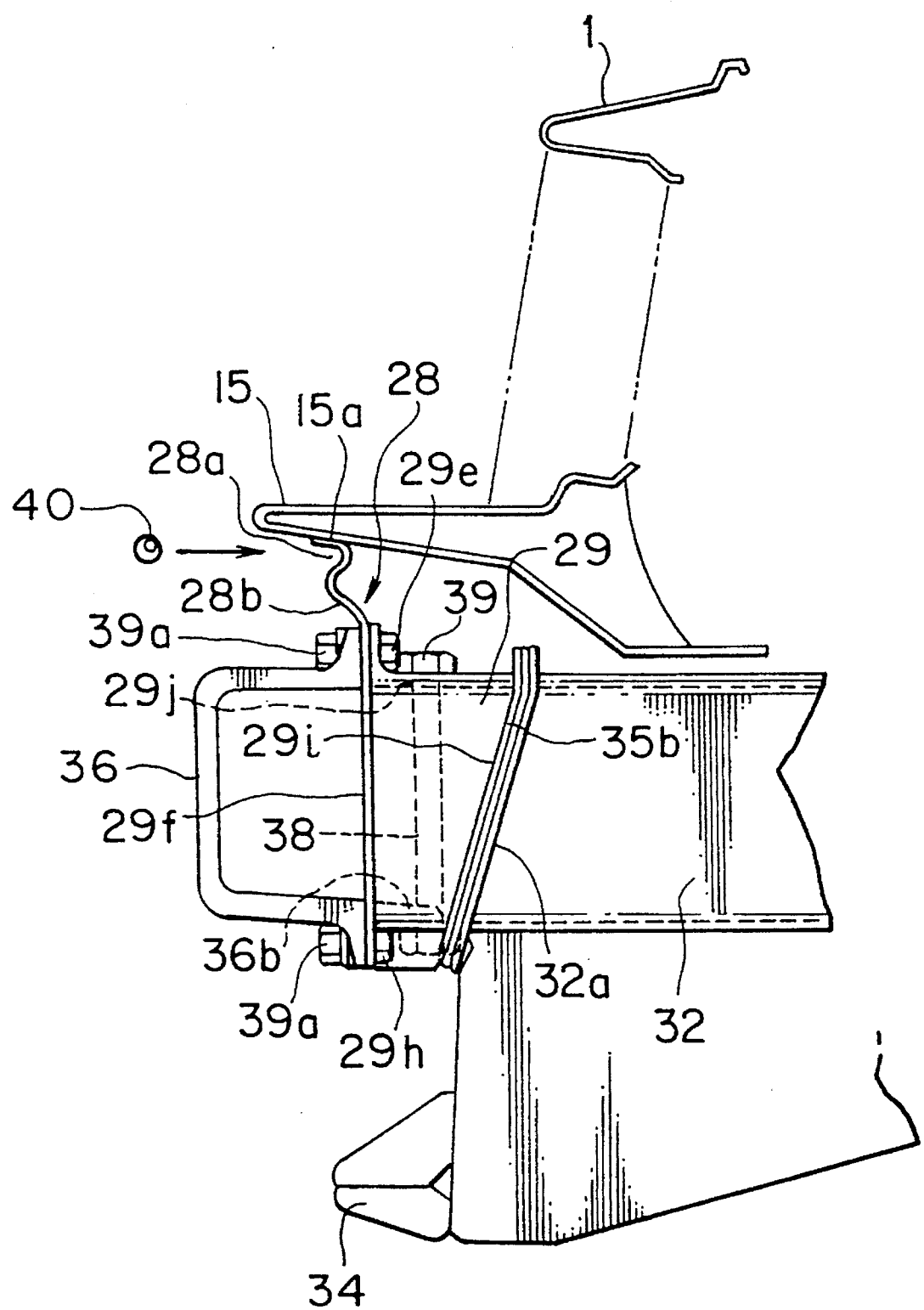
FIG. 9 is a side view of the module carrier structure of FIG. 6 along line IX—IX in a state where it is fastened to the vehicle.

An upper portion of the bracket 28 is in supporting contact with a lower surface of the middle frame portion 15 of the module carrier 1, as shown at 15a in FIG. 9, to provide mutual positioning with the module carrier 1. The bracket 28 is a roughly T-shaped member having a horizontally elongated portion 28a that is U-shaped in cross section and is in contact with the lower surface of the middle frame 15, and a stay portion 28b provided to extend downward from the portion 28a. A mounting hole 28d for fixing a rear beam 36 to be described below is provided through the stay portion 28b, and the attachment body 29 is attached therebelow. A wire harness 40 is accommodated in a forward-facing groove 28c of the elongated portion 28a of U-shaped cross section.

Figure 8:
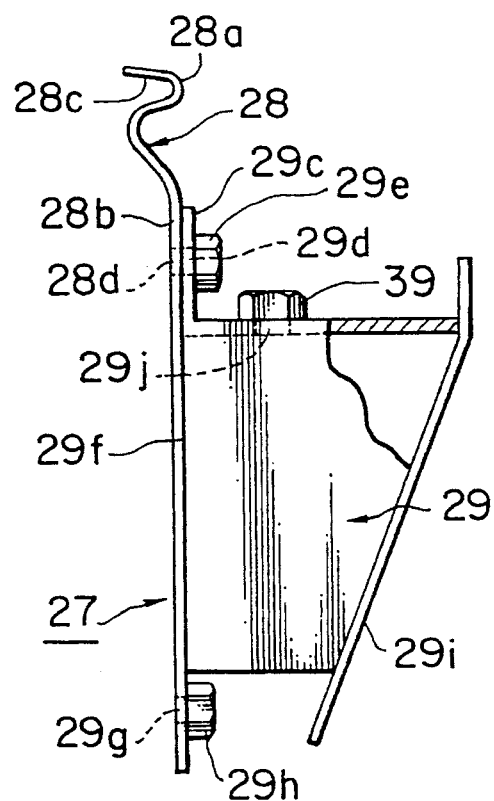
FIG. 8 is a side view of the fastening attachment.

The body 29 of the attachment 27 has a mount portion 29a that is formed to have an inverted U-shaped section designed to engage from above with a side member bracket 35 of a closed cross section fastened to the forward end of a front side member 32 as described below. As shown in FIG. 8, an upwardly directed flange 29c protrudes upward from a forward upper portion of the mount portion 29a. The flange 29c overlaps a rear surface of the stay portion 28b of the mounting bracket 28. The flange 29c has a hole 29d that matches the mounting hole 28d in the stay portion 28b, and a nut 29e is fixed by welding to the rear of the hole 29d. A front side flange 29f is provided on each side of a forward end of the mount portion 29a, a mounting hole 29g is formed in each of the flanges 29f, and a nut 29h is fixed by welding to each side flange 29f at the rear of its mounting hole 29g. A rear side flange 29i is formed on each side of a rear portion of the mount portion 29a.

A front of the vehicle body 31 (see FIG. 6) supports the module carrier 1 on a front portion thereof. The module carrier 1 comprises left and right front upper frames (not shown in the figure) that extend forward from each side of the vehicle's width of a dash panel separating the engine compartment from the interior of the vehicle. The front of the vehicle body 31 comprises also left and right front side members 32 that extend along the left and right front upper frames from a front portion of a front floor panel. The front of the vehicle body further comprises brackets 33 connecting the front upper frames to the front side members 32, a front end cross member 34 connecting the left and right front side members 32, and side member brackets 35 coupled with the forward ends of the front side members 32 and extending toward the front of the vehicle.

Each side member bracket 35 has a roughly rectangular closed cross-section and is provided with bolt through holes 35a in upper and lower walls thereof. The forward end of each front side member 32 and the rearward end of each side member bracket 35 have flanges 32a and 35b that slant downward toward the front and are connected to engage with one another.

As shown in FIG. 9, the rear beam 36 has a hat shape in cross section and is horizontally attached to a forward portion of the front of the vehicle body 31. A plurality of mounting holes 36a are formed close to each end of the rear beam 36 in order to fasten the rear beam 36. The rear beam 36 is fixed to the attachments 27 by bolts 39a that pass through the mounting holes 36a into the nuts 29e in the upper flanges 29c, through the mounting hole 28d in the brackets 28. Rearwardly protruding holder members 36b (FIG. 9) are fixed to the rear of the rear beam 36 close to the ends thereof. The holder members 36b are inserted into front openings of the side member brackets 35, are placed on lower wall surfaces of these openings, and support the rear beam 36, as shown in FIG. 9.

The rear beam 36 is equivalent to the rear beam 7a shown in FIG. 3. A bumper with a built-in shock absorber material that is similar to the shock absorber material 7c shown in FIG. 3 is provided on a front portion of the rear beam 36, and a bumper surface member similar to that shown in FIG. 3 is provided on the front surface of the bumper. With the wire harness 40 accommodated horizontally within the groove 28c in the forward portion of the horizontally elongated portion 28a, which is part of the middle frame portion 15, the bumper surface member is attached to the middle frame portion 15 to cover the front part of the middle frame portion 15.

The description now turns to the assembly of the above front vehicle structure of the second embodiment.

As a pre-assembly step, the radiator 2 is mounted in the same manner as that shown in FIG. 3 in the radiator assembly frame 11 of the module carrier 1 to which the fastening attachments 27 have been fixed at predetermined positions, headlights are also mounted in the headlight mounting portions 17, and other components such as the cooling fan 4 and the condenser 3 of the air conditioner are attached. The thus-assembled module carrier 1 is then lowered so that the flanges 35b of the side member brackets 35 coupled to the front ends of the front side members 32 are placed into contact with the rear flanges 29i of the attachment bodies 29, while movement of the module carrier 1 toward the rear of the vehicle is regulated. The attachment bodies 29 are placed so that they rest on top of the side member brackets 35. This positions the module carrier 1 over the front of the vehicle body 31.

Next, bolts 38 (FIG. 9) for fastening the module carrier are inserted from below into the through holes 35a formed in the upper and lower walls of the side member brackets 35 and through holes 29j provided through the upper walls of the attachment bodies 29 (see FIGS. 7 and 9). The bolts 38 are screwed into nuts 39 fixed in positions corresponding to the holes 29j. This fixes the attachments 27 to the side member brackets 35, thus integrating the module carrier 1 and the front side members 32. Through holes 34a are provided near the ends of the front end cross members 34 for the purpose of inserting the bolts 38 and a bolt tightening tool (not shown in the figures).

The module carrier 1 coupled integrally with the front side members 32 via the fastening attachments 27 and the side member brackets 35 in this manner is then attached to the front upper frames and brackets 33 that connect the front upper frames to the front side members 32, by means such as bolts (not shown in the figures) protruding forward from the front of the vehicle at suitable locations. The holder members 36b formed in the lower edge of the rear beam 36 are placed on top of the lower wall surfaces of the side member brackets 35 and are positioned in the vertical direction and in the lateral direction of the vehicle. Bolts 39a (FIGS. 6 and 9) as bumper attachment means are inserted from the front side of the vehicle through the mounting holes 36a that open in the lower edge of the rear beam 36. The bolts 39a are passed through the mounting holes 28d provided through the stay portions 28b of the brackets 28 and the mounting holes 29g provided through the side flanges 29f of the attachment bodies 29, and are screwed into the nuts 29e and 29h. This attaches the rear beam 36 horizontally to the left and right front side members 32 with the attachments 27 therebetween.

The wire harness 40 for the electrical components mounted on the module carrier 1 and electrical components such as lights mounted on the bumper are then inserted into the middle frame portion 15 of the module carrier 1 and the groove 28c in the horizontally elongated portion 28a of the bracket 28. The wire harness 40 is preferably protected by being covered with a corrugated tube or the like.

The wire harness 40 arranged along the middle frame portion 15 of the module carrier 1 is covered by the shock absorber material arranged on the front surface of the rear beam 36 and the bumper surface member.

In the second embodiment of the present invention as described above, by lowering the module carrier 1 mounted on the attachment bodies 29 of inverted U-shaped cross section, the attachment bodies 29 are mounted from above on the side member brackets 35 connected to the front ends of the front side members 32. This enables mutual positioning of the module carrier 1 and the front of the vehicle body 31. Therefore, the positioning work is made much easier than in the prior art, and the directions of the work in which the bolts and other fastening means are tightened are limited to downward and from the front side of the vehicle. Since the insertion of the wire harness 40 into the middle frame 15 of the module carrier 1 facilitates the mounting, the harness mounting holes and fastening means can be omitted, enabling rationalization of the work of fitting the harness, and thus greatly simplifying and facilitating the work.

Since the rear beam 36 is connected via the attachment bodies 29 of inverted U-shaped cross section covering the side member brackets 35, the attachment bodies 29 are readily deformed during a collision and function efficiently as means for absorbing collision energy from the rear beam 36. This enables a design in which only the attachment bodies 29 deform in a minor collision.

The embodiments shown in the figures have concerned an integral coupling of the mounting brackets 28 and the attachment bodies 29. However, a configuration is possible in which these components are connected together in a mutually removable fashion by bolts or the like, to simplify removal of the structural components after assembly, and also facilitate exchange and repair of the various components. An integral structure of each front side member 32 and the corresponding side member bracket 35 could also help in reducing the number of mounting components.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A module carrier structure for a front end of a vehicle having a front bumper with a rear bumper beam connected to said front end, a radiator in an engine compartment behind said front bumper, a condenser of an air conditioner, and a wire harness for providing electric current to equipment of said vehicle, said module carrier structure comprising:

a radiator assembly frame for mounting said radiator and said condenser therein, said frame comprising a horizontal upper frame portion, a horizontal middle frame portion below said upper frame portion, and harness fitting groove means extending horizontally on said middle frame portion for receiving and securing said wire harness;

wherein said harness fitting groove means comprises at least one forwardly facing, approximately U-shaped groove.

2. The module carrier structure according to claim 1, wherein:

said middle frame portion rests on said rear bumper beam so as to allow shifting movement of the bumper beam relative to the middle frame portion.

3. The module carrier structure according to claim 1, further comprising:

a horizontal lower support frame portion provided under said assembly frame for mounting said radiator and said condenser.

4. The module carrier structure according to claim 1, wherein:

said groove means extends throughout a horizontal length of said middle frame portion.

5. The module carrier structure according to claim 1, wherein:

said front bumper has a bumper surface sheet that is fastened to said middle frame portion in a manner to overlie said harness fitting groove means.

6. The module carrier structure according to claim 1, further comprising:

fastening attachments removably mounted on the vehicle front end, said attachments having means for fixedly attaching thereon said rear bumper beam of the front bumper; and mounting brackets provided on said fastening attachments, respectively, and each having a horizontally extending portion with said groove means, said horizontally extending portion being in supporting contact with a lower surface of said middle frame portion.

7. The module carrier structure according to claim 6, wherein:

each of said fastening attachments comprises an attachment body of a generally inverted-U shape, said attachment body being adapted to be mounted from above on the vehicle front end.

8. The module carrier structure according to claim 7, wherein:

each of said mounting brackets comprises a member separable from the attachment body thereof.

9. The module carrier structure according to claim 6, wherein:

said means for fixedly attaching the rear bumper beam comprises mounting holes provided in said fastening attachments.

10. The module carrier structure according to claim 6, wherein:

each of the mounting brackets is of a T-shape when seen from a forward side.

* * * * *